(12) United States Patent
Hirao et al.

(10) Patent No.: US 8,745,443 B2
(45) Date of Patent: Jun. 3, 2014

(54) MEMORY SYSTEM

(75) Inventors: Takashi Hirao, Tokyo (JP); Mitsunori Tadokoro, Kanagawa (JP); Hirokuni Yano, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 267 days.

(21) Appl. No.: 13/326,872

(22) Filed: Dec. 15, 2011

(65) Prior Publication Data

US 2012/0159244 A1    Jun. 21, 2012

(30) Foreign Application Priority Data

Dec. 15, 2010 (JP) ................................ 2010-279333

(51) Int. Cl.
    *G06F 11/00* (2006.01)
(52) U.S. Cl.
    USPC ............................................................ 714/15
(58) Field of Classification Search
    USPC ............................................... 714/15, 20–22
    See application file for complete search history.

(56) References Cited

U.S. PATENT DOCUMENTS

| | | | |
|---|---|---|---|
| 6,901,479 B2 * | 5/2005 | Tomita | 711/114 |
| 7,283,260 B2 * | 10/2007 | Galban | 358/1.14 |
| 7,925,925 B2 * | 4/2011 | Royer et al. | 714/22 |
| 7,949,910 B2 | 5/2011 | Kanno et al. | |
| 7,953,920 B2 | 5/2011 | Yano et al. | |
| 7,958,411 B2 | 6/2011 | Kanno et al. | |
| 7,962,688 B2 | 6/2011 | Yano et al. | |
| 8,015,347 B2 | 9/2011 | Kitsunai et al. | |
| 8,060,797 B2 | 11/2011 | Hida et al. | |
| 8,065,470 B2 | 11/2011 | Yano et al. | |
| 8,065,471 B2 | 11/2011 | Yano et al. | |
| 2007/0016719 A1 | 1/2007 | Ono et al. | |
| 2008/0301359 A1 * | 12/2008 | Smith et al. | 711/103 |
| 2009/0172342 A1 * | 7/2009 | Wong | 711/206 |
| 2010/0138591 A1 | 6/2010 | Yano et al. | |
| 2010/0153626 A1 | 6/2010 | Yano et al. | |
| 2010/0161885 A1 | 6/2010 | Kanno et al. | |
| 2010/0169549 A1 | 7/2010 | Yano et al. | |
| 2010/0169551 A1 | 7/2010 | Yano et al. | |

(Continued)

FOREIGN PATENT DOCUMENTS

| | | |
|---|---|---|
| JP | 2009-217391 | 9/2009 |
| JP | 2010-157139 | 7/2010 |

OTHER PUBLICATIONS

U.S. Appl. No. 13/271,838, filed Oct. 12, 2011, Hirokuni Yano, et al.

(Continued)

*Primary Examiner* — Michael Maskulinski
*Assistant Examiner* — Neil Miles
(74) *Attorney, Agent, or Firm* — Oblon, Spivak, McClelland, Maier & Neustadt, L.L.P.

(57) ABSTRACT

According to one embodiment, a memory system includes a data manager and a data restorer. The data manager multiplexes difference logs by a parallel writing operation and stores them in a second storage area, the difference logs being difference logs indicating difference information before and after update of a management table; and thereafter multiplexes predetermined data as finalizing logs and stores them in the second storage area. The data restorer determines a system status at startup of the memory system, by judging whether irregular power-off occurs or data destruction occurs in the second storage area, based on a data storage state of the difference logs and the finalizing logs stored in the second storage area.

22 Claims, 10 Drawing Sheets

(56) References Cited

U.S. PATENT DOCUMENTS

| | | |
|---|---|---|
| 2010/0169553 A1 | 7/2010 | Yano et al. |
| 2010/0169597 A1 | 7/2010 | Yonezawa et al. |
| 2010/0205353 A1 | 8/2010 | Miyamoto et al. |
| 2010/0223424 A1 | 9/2010 | Kitsunai et al. |
| 2011/0173380 A1 | 7/2011 | Yano et al. |
| 2011/0185106 A1 | 7/2011 | Yano et al. |
| 2011/0185107 A1 | 7/2011 | Yano et al. |
| 2011/0219177 A1 | 9/2011 | Kanno et al. |
| 2011/0231610 A1 | 9/2011 | Yano et al. |
| 2011/0238899 A1 | 9/2011 | Yano et al. |
| 2012/0221776 A1 | 8/2012 | Yoshihashi et al. |

OTHER PUBLICATIONS

U.S. Appl. No. 13/052,146, filed Mar. 21, 2011, Naoki Ootsuka, et al.
U.S. Appl. No. 13/609,991, filed Sep. 11, 2012, Hirao, et al.

* cited by examiner

FIG.11A: p0 (DATA), p1 (DATA), p2 (ERASED), p3 (ERASED), p3' (UNREAD)

FIG.11B: p0 (DATA), p1 (DATA), p2 (ERROR), p3 (ERASED), p3' (UNREAD)

FIG.11C: p0 (DATA), p1 (DATA), p2 (ERROR), p3 (ERROR), p3' (UNREAD)

FIG.11D: p0 (DATA), p1 (DATA), p2 (DATA), p3 (ERASED), p3' (ERASED)

FIG.11E: p0 (DATA), p1 (DATA), p2 (DATA), p3 (ERROR), p3' (ERASED)

FIG.11F: p0 (DATA), p1 (DATA), p2 (DATA), p3 (ERROR), p3' (ERROR)

FIG.11G: p0 (DATA), p1 (DATA), p2 (DATA), p3 (DATA), p3' (ERASED)

FIG.11H: p0 (DATA), p1 (DATA), p2 (DATA), p3 (DATA), p3' (DATA)

FIG.11I: p0 (DATA), p1 (DATA), p2 (DATA), p3 (ERROR), p3' (DATA)

FIG.11J: p0 (DATA), p1 (DATA), p2 (ERROR), p3 (DATA), p3' (DATA)

FIG.11K: p0 (DATA), p1 (ERASED), p2 (ERASED), p3 (UNREAD), p3' (UNREAD)

FIG.11L: p0 (DATA), p1 (ERROR), p2 (UNREAD), p3 (UNREAD), p3' (UNREAD)

FIG.11M: p0 (DATA), p1 (ERROR), p2 (ERROR), p3 (UNREAD), p3' (UNREAD)

FIG.12
ch1
ch0
| | WRITTEN | ERROR | ERASED |
|---|---|---|---|
| WRITTEN | WRITTEN | WRITTEN | WRITTEN |
| ERROR | WRITTEN | ERROR | ERROR |
| ERASED | WRITTEN | ERROR | ERASED |
FIG.13A
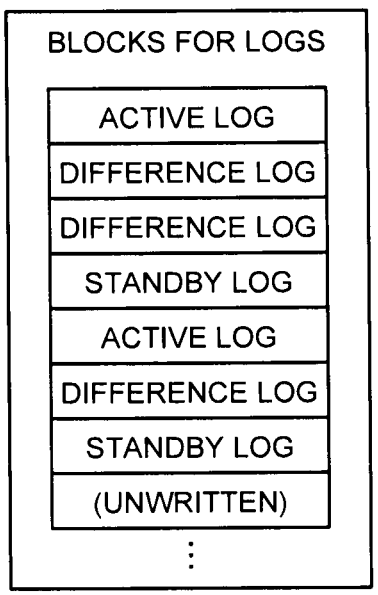
FIG.13B
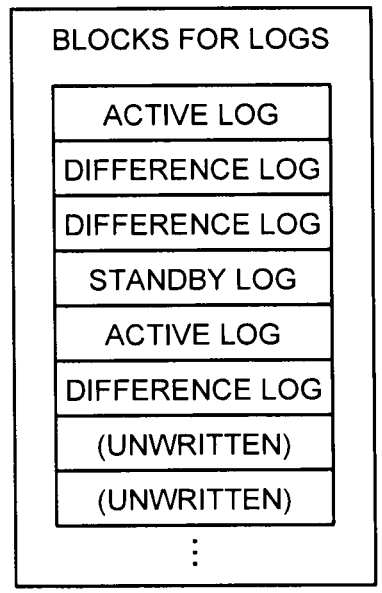

MEMORY SYSTEM

CROSS-REFERENCE TO RELATED APPLICATIONS

This application is based upon and claims the benefit of priority from the Japanese Patent Application No. 2010-279333, filed on Dec. 15, 2010; the entire contents of which are incorporated herein by reference.

FIELD

An embodiment described herein relates generally to a memory system.

BACKGROUND

In recent years, with a progress of a larger capacity of NAND flash memory as a nonvolatile semiconductor storage device, an SSD (Solid State Drive) is being paid attention to, as a memory system on which the NAND flash memory is mounted.

BRIEF DESCRIPTION OF THE DRAWINGS

FIG. 11A to FIG. 11M are views illustrating a classification example of read-out states of the difference logs.

FIG. 12 is a view for describing an example of handling duplicated pages.

FIG. 13A and FIG. 13B are views illustrating a write procedure of active logs and standby logs.

DETAILED DESCRIPTION

In general, according to an embodiment, a memory system includes a volatile first storage area, and a nonvolatile second storage area capable of storing a management table for controlling management information by which a logical address designated by a host device and a physical storage position of data are associated with each other. Further, the memory system includes a data manager. The data manager transmits the management table stored in the second storage area, to the first storage area at startup of the memory system. Further, the data manager stores difference logs indicating difference information before and after update of the management table in the first storage area, is stored in the first storage area, when an event to update the management table occurs. Further, the data manager saves the difference logs in the second storage area and incorporates the difference logs into the management table stored in the first storage area, when a predetermined condition is satisfied. Further, the memory system includes a data restorer that determines a system status at startup of the memory system based on the difference logs stored in the second storage, whether the difference logs have been normally stored in the second storage area, whether irregular power-off occurs during saving the difference logs in the second storage area, or whether data destruction occurs after the difference logs having been stored in the second storage area.

Then, the data manager multiplexes the difference logs and stores them in the second storage area by parallel writing operation, and thereafter further multiplexes predetermined data as finalizing logs and stores them in the second storage area. Further, the data restorer determines the system status based on a data storage state of the difference logs and the finalizing logs stored in the second storage area.

The memory system according to preferred embodiment will be described in detail hereafter, with reference to appended drawings. Note that the present invention is not limited to the following embodiment.

(Embodiment)

Figure 1:
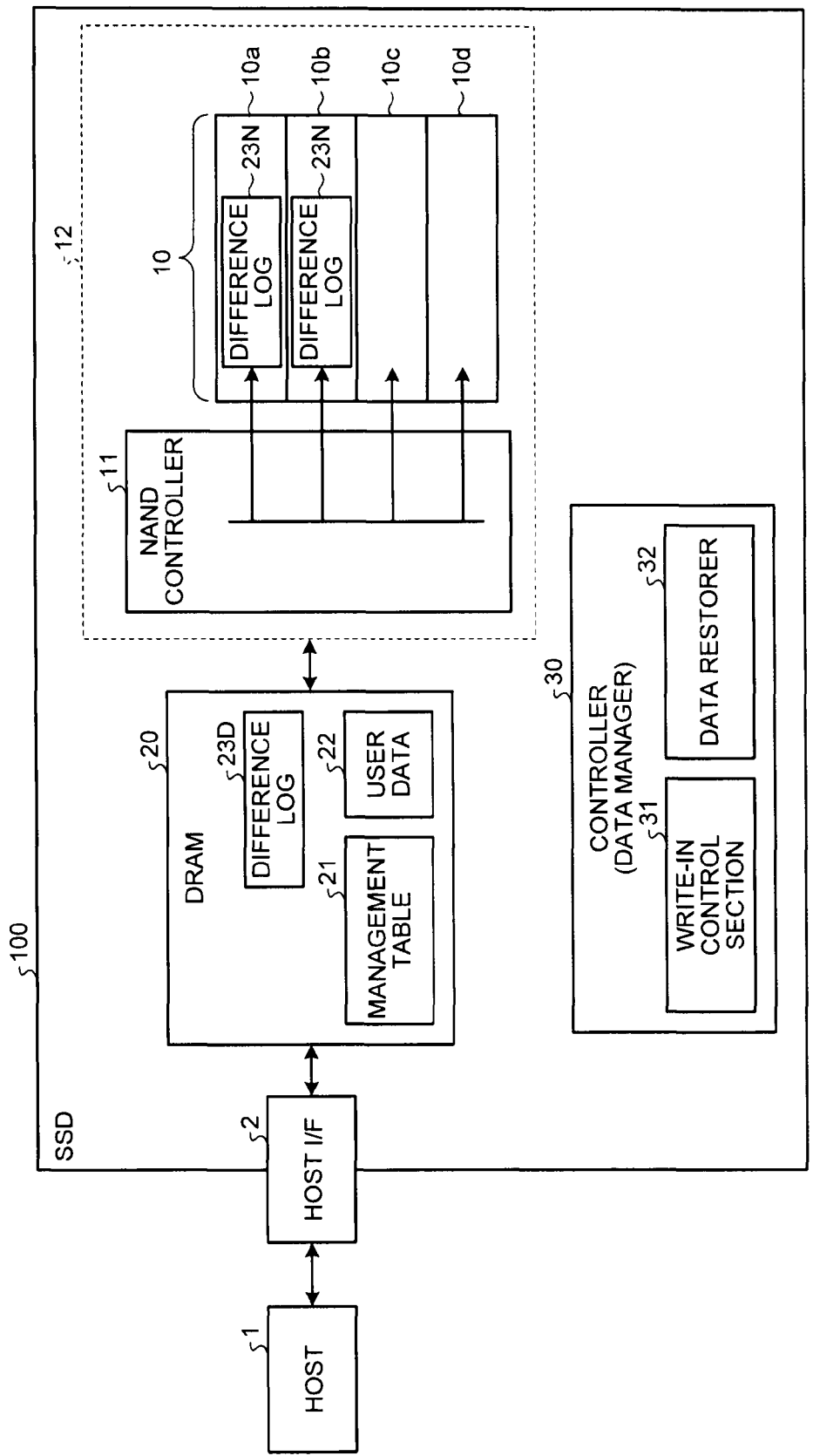
FIG. 1 is a block diagram illustrating a constitutional example of an SSD.

FIG. 1 is a block diagram illustrating a constitutional example of the SSD. An SSD (Solid State Drive) 100 as an example of a semiconductor storage device using NAND flash memory (abbreviated as NAND memory hereafter), is applied to a memory system, etc. The SSD 100 of this embodiment performs multiplexing (for example, duplicating) storage of management data (difference logs 23N as will be described later) for securing reliability, when important data (management data) is written to be stored in a nonvolatile way. At this time, the SSD 100 achieves shortening of a write-in time by parallel write (parallel page programming operation) of the management data. Further, the SSD 100 writes a last page of the management data again after the management data is written, so that irregular power-off during write-in operation can be recognized. For example, when written data cannot be read partially or totally, the SSD 100 judges whether the irregular power-off occurs during write-in operation, or whether the data destruction occurs after write-in operation, based on a data storage state in the NAND memory 10. Then, the SSD 100 restores only restorable data.

The SSD 100 is connected to a personal computer or a host device (abbreviated as a host hereafter) 1 such as a CPU core, via a host I/F 2, which is a memory connection interface such as ATA interface (ATA I/F), and functions as en external memory of the host 1.

The SSD 100 includes DRAM 20 as volatile semiconductor memory; a controller 30 that performs data management; and a data storage area 12 that controls data storage processing to store data.

The data storage area 12 includes NAND memory 10 as nonvolatile semiconductor memory; and a NAND controller 11 that controls the NAND memory 10.

For example, the NAND memory 10 has four parallel operation elements 10a to 10d that perform four parallel operations, and four parallel operation elements 10a to 10d are connected to the NAND controller 11 by four channels, etc.

Each of the parallel operation elements 10a to 10d is constituted of a plurality of banks (for example four banks) that achieve bank interleaving, and each bank is constituted of a plurality of NAND memory chips (for example two memory chips). For example, each memory chip is divided into two districts of plane 0 and plane 1 including a plurality of physical blocks in each block. Plane 0 and plane 1 include mutually independent peripheral circuits (for example, a row decoder, a column decoder, a page buffer, and a data cache, etc.), thus making it possible to perform simultaneous erasing/writing/reading by using a multiple speed mode.

Thus, each NAND memory chip of the NAND memory 10 achieves a parallel operation using a plurality of channels, a bank interleaving operation by a plurality of banks, and a parallel operation by the multiple mode using a plurality of planes. Note that each memory chip may be divided into four planes, or may not be divided at all. In this embodiment, explanation is given for a case that parallel write of data is performed to two blocks that can be accessed in parallel.

The DRAM 20 functions as a cache for data transmission between the host 1 and the NAND memory 10, and functions as memory for a work area. A management table 21, user data 22, and difference logs 23D are given as examples stored in the memory for a work area in the DRAM 20. Note that the cache for data transmission is not necessarily disposed between the host I/F 2 and the data storage area 12. Data transmission may be directly performed by disposing buffer memory with small capacity between the host I/F 2 and the data storage area 12.

The management table 21 is a master table (snapshot) which is formed when the management table 21 stored in the NAND memory 10 is expanded at startup of a system. The management table 21 is an information table for controlling management information, by which logical address designated by the host 1 and a physical storage position of data are associated with each other. In other words, the management table (the address translation table) 21 translates logical addresses designated by the host 1 to physical addresses of the NAND memory 10.

Further, the difference logs 23D are changed differences of the management table 21. When write-in of the user data 22 and read-in of data is carried out into the management table 21, the management table 21 and the difference logs 23D are expanded on the DRAM 20.

The difference logs 23D, being the differences of the management table 21, are stored in the DRAM 20 once, when there is a write-in of the user data 22 or change of a storage destination block. However, such difference logs 23D are written into the NAND memory 10 as difference logs 23N when a certain amount is stored therein. They are called commit logs. In other words, while the SSD 100 is operated, the SSD 100 reflects (incorporates) the difference logs 23D in the management table 21 at a predetermined timing, and stores the management table 21 in the NAND memory 10 as difference logs 23N. Further, while the SSD 100 is operated, the SSD 100 stores the management table 21 in the NAND memory 10 at a predetermined timing.

Specifically, time-series log data to be the difference logs 23D are sequentially arranged and stored in the DRAM 20. Then, the difference logs 23D are written into the NAND memory 10 as difference logs 23N at each processing time of the commit. Time-series difference logs 23N are arranged and stored in the NAND memory 10. Then, when storage of the management table 21 (snapshot) in the NAND memory 10 is ended, the difference logs 23N written into the NAND memory 10 before the management table 21 is stored therein, are not required in restoration processing.

In this embodiment, for example, newest difference log 23N and one preceding difference log 23N stored at a preceding time, are stored in the NAND memory 10. Then, when it is confirmed that the newest difference log 23N is stored in the NAND memory 10, a storage area in the DRAM 20 in which one preceding difference log 23N is stored, is released as a new data storage area.

Note that FeRAM (Ferroelectric Random Access Memory), MRAM (Magnetoresistive Random Access Memory), PRAM (Phase change Random Access Memory), SRAM (Static Random Access Memory), etc., may be used instead of the DRAM 20. Further, DRAM, FeRAM, MRAM, PRAM, and SRAM may be embedded on the controller 30.

The NAND controller 11 controls data transmission between the host 1 and the NAND memory 10, via the DRAM 20. Further, the NAND controller 11 performs erasing, writing, reading, and judging read-in error and an erased state, in the NAND memory 10. The NAND controller 11 of this embodiment has a function of performing parallel write of data stored in the NAND memory 10.

The controller 30, being the data manager, has a function of controlling data so that data in the DRAM 20 is stored in the NAND memory 10, and has a function of controlling data so that data in the NAND memory 10 is restored in the DRAM 20. The controller 30 transmits the management table 21 stored in the NAND memory 10, to the DRAM 20 at startup of the system. Further, when an event to update the management table 21 occurs, difference logs indicating difference information before and after update of the management table 21 stored in the DRAM 20, is stored in the DRAM 20 as difference logs 23D. Further, when a predetermined condition is established, the controller 30 stores the difference logs 23D stored in the DRAM 20, in the NAND memory 10 as difference logs 23N, and reflects contents of the difference logs 23D stored in the DRAM 20, in the management table 21 stored in the DRAM 20.

Further, the controller 30 of this embodiment multiplexes the difference logs 23N by parallel write-in operation and stores multiplexed data in the NAND memory 10, and thereafter multiplexes again a page stored finally in the NAND memory 10 out of the difference logs 23D stored in the DRAM 20, by parallel write-in operation, and stores multiplexed data in the NAND memory 10. Further, the controller 30 controls each constituent element in the SSD 100. The controller 30 includes a write control section (restore) 31 and a data restorer 32.

The write control section 31 performs write/read control based on the management table 21. For example, the write control section 31 performs write control, so that data in the DRAM 20 is stored in the NAND memory 10.

The data restorer 32 determines a previous system status (1) whether normal halt of a system occurs, (2) whether irregular power-off occurs, and (3) whether data destruction occurs, based on a data state of the difference logs 23N written into the NAND memory 10. When the normal halt of a system occurs previously, the data restorer 32 controls data so that the difference logs 23N stored in the NAND memory 10 are restored in the DRAM 20. Further, when it is so judged that irregular power-off occurs or data destruction occurs, the data restorer 32 restores only restorable data in the NAND memory 10.

In order to hold data across ON, OFF of a power supply, the management table 21 itself needs to be stored in a nonvolatile way, wherein the management table 21 has contents where and how the data is stored. The management table 21 is expanded on volatile DRAM 10 from nonvolatile NAND memory 10, and the expanded management table 21 is updated by write-in of data. The management table 21 becomes larger in size, with a larger capacity of the memory, and therefore there is an adverse influence on an efficiency of writing data into the NAND memory 10, also an adverse influence on a service life of the NAND memory 10, and a processing time required for storage, if an entire body of the management table 21 is stored in the NAND memory 10 every time there is a change in writing data.

Therefore, the management table 21 is stored in a form of a snapshot of the entire body of the management table 21 at a certain time point, and in a form of changed difference logs (difference logs 23N) from a time point where the snapshot is stored. Then, usually only the difference logs 23N as changed differences, are stored in the NAND memory 10. In this embodiment, duplicated storage is carried out into the NAND memory 10 by parallel write of the difference logs 23N, so that a write performance of the NAND memory 10 (writing speed) is improved.

Incidentally, even when unexpected power-off occurs (irregular power-off occurs) while the system is being operated, stored data is desired to be held (restored). For example, the management table 21 (master table) expanded on the DRAM 20 is required to be restored to a state before power is off, even if the power is off. Therefore, a mechanism of storing the master table in the nonvolatile NAND memory 10 is necessary. The snapshot indicates the entire body of the nonvolatile management table 21 in the NAND memory 10, and the master table expanded on the DRAM 20 is stored as it is in the NAND memory 10, and this is called "the snapshot is taken".

Further, when the stored data is restored, in order to obtain referential integrity of the management table 21, there is a necessity for judging whether normal power-off sequence is performed, or irregular power-off is performed. Further, when data destruction occurs in the management table 21, data cannot be suitably read, and also there is a possibility that a secondary breakdown is induced in the SSD 100 or the system with SSD 100 mounted thereon. Therefore, operation of the SSD 100, with the data destruction involved in the management table 21, is avoided.

For example, there is a tendency that a fraction defective is increased in the memory, due to degradation by increase of the number of write/erase of data, due to degradation by repeated reading, and due to aging degradation. Therefore, data destruction occurs in some cases, even in a case that the data writing is successful during write-in operation of data. Therefore, when the data destruction occurs in the management table 21, the data destruction is detected to avoid normal operation. Particularly, the difference logs 23N are stored in chronological order, and therefore the referential integrity cannot be obtained when the data under storage is irregular data, or any one of the difference logs 23N is missing. Accordingly, in this embodiment, when the management table 21 is restored by system startup processing (when initialization processing is performed after power is turned-on), occurrence of the irregular power-off and the data destruction are detected, to thereby enhance reliability of the SSD 100.

The NAND memory 10 needs to erase data before writing the data. Further, in the NAND memory 10, an erase unit and a write-in unit are different from each other. The NAND memory 10 is defined so that the erase unit is a block unit, the write-in unit is a page unit, and a write order is consecutive. In addition, a block is constituted of a plurality of pages.

The NAND controller 11 mounted on the SSD 100, includes an interface capable of performing parallel write of data by a bank unit and a channel unit, or performing write-in and read-in of data. The NAND controller 11 controls to shorten a write-in time by performing parallel write to a block which is accessible in parallel. In this embodiment, a write-in state of the difference logs 23N (whether irregular power-off occurs) is judged by utilizing a device characteristic (parallel write) of the NAND memory 10 and a mechanism of the NAND controller 11.

Figure 2:
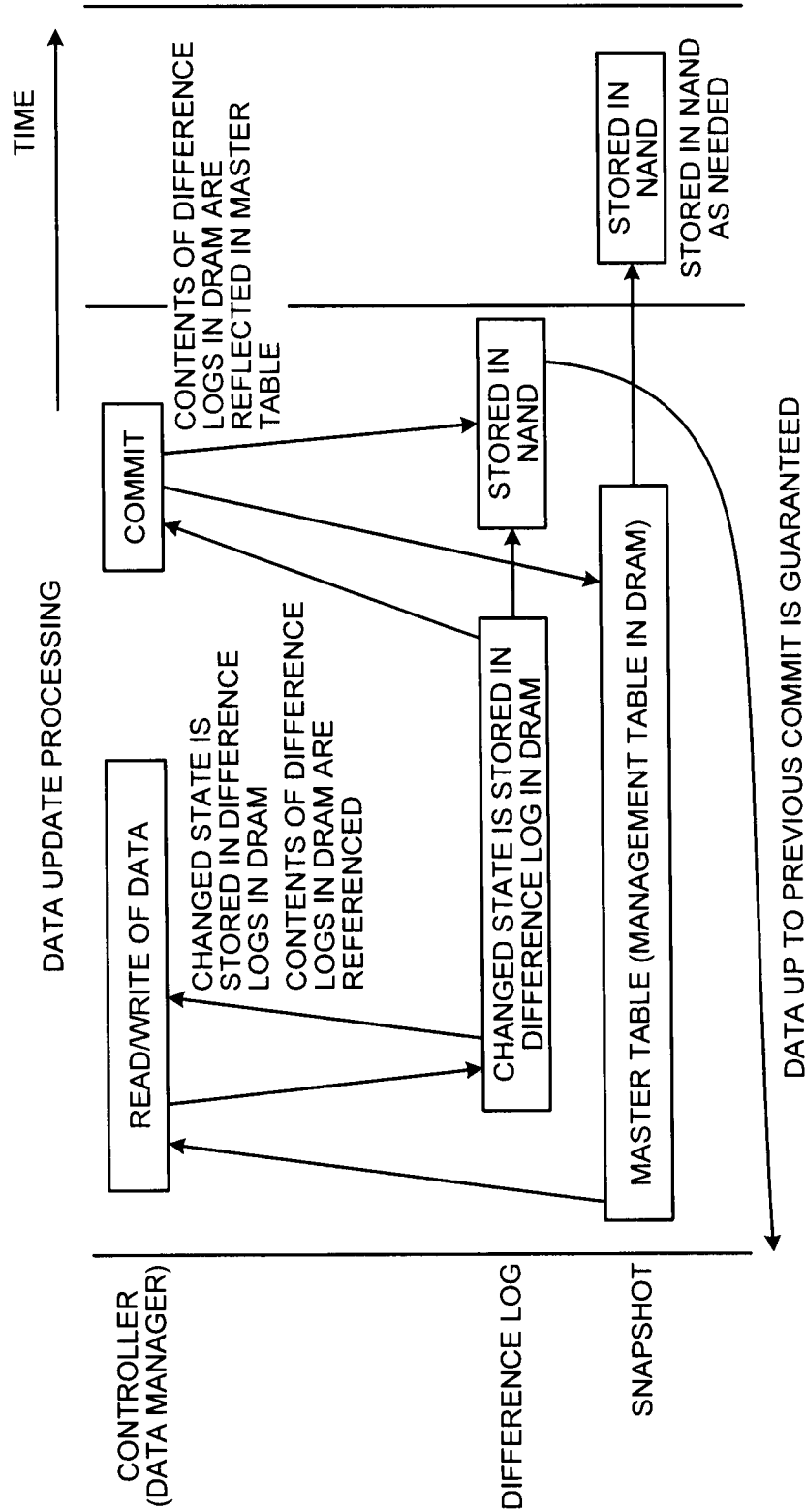
FIG. 2 is a view conceptually illustrating a generation form of a snapshot and a log.

FIG. 2 is a view conceptually illustrating a generation state of the snapshot and logs. FIG. 2 illustrates how the snapshot and the logs are updated when the data is updated. When the data is updated by the controller (data manager) 30, changed contents added to the master table (management table in the DRAM) are accumulated in the difference logs 23D in the DRAM 20. The master table is directly updated depending on the kind of the management table, and the updated contents are accumulated in the difference logs 23D, or a changed area is secured in the difference logs 23D with no direct change added to the master table, to thereby store the updated contents in this area. When write-in/read-out operation of data is performed, not only the master table but also the accumulated difference logs 23D are referenced.

When update of data is stabilized, the controller 30 performs log commit. In a commit processing, contents of the difference logs 23D are reflected in the master table as needed, and further contents of the difference logs 23D are stored in the NAND memory 10 as difference logs 23N and non-volatilized. Thus, the data before the previous commit is secured.

The snapshot is stored in the NAND memory 10 when the storage area of the logs is insufficient, in a case of a normal power-off sequence. When write of the difference logs 23N or the snapshot into the NAND memory 10 is ended, non-volatilization of the management table is completed.

Figure 3:
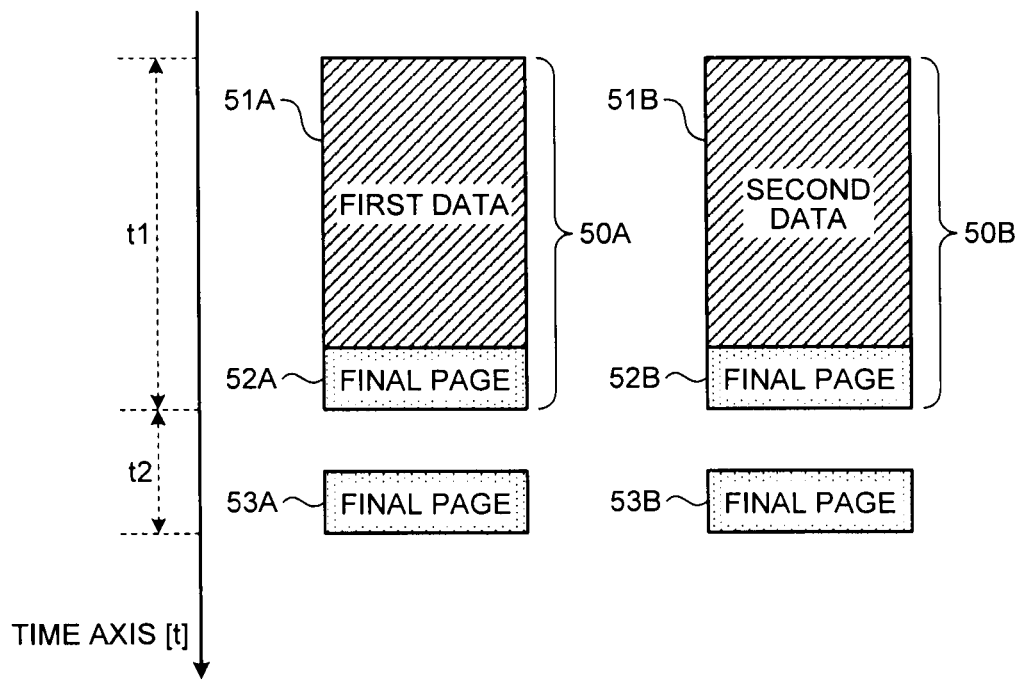
FIG. 3 is a view for describing a timing of parallel write of difference logs.

FIG. 3 is a view for describing a parallel write timing of the difference logs. In the SSD 100, a block into which the difference logs 23N are duplicated and written, is employed from parallel-writable blocks, and the write-in operation is simultaneously performed into this block.

For example, the SSD 100 writes first data 51A excluding a last page, a final page 52A, being a page of the last (page end), and a final page 53A, being the same data as the data of the final page 52A, into the NAND memory 10 as the difference logs 23N. Similarly, the SSD 100 writes second data 51B excluding the last page, a final page 52B, being the page end, and a final page 53B, being the same data as the data of the final page 52B, into the NAND memory 10 as the difference logs 23N. The SSD 100 writes first data 51A and the final page 52A into an area 50A, and writes the second data 51B and the final page 52B into an area 50B. At this time, in the SSD 100, write into the area 50A and write into the area 50B are simultaneously performed by page units (parallel page programming operation).

When data is simply simultaneously written into the NAND memory 10, it is difficult to judge how long the data is written when irregular power-off occurs during write-in operation, and also it is difficult to discriminate an unreadable page from data destruction due to degradation, etc. Therefore, in this embodiment, the last page, being the page end of write scheduled data (difference logs 23N) is written twice by shifting time, to thereby perform duplication for redundancy, and perform duplication for judging whether irregular power-off occurs.

Specifically, after the final page 52A is written into the area 50A, the final page 53A is written. Further, after the final page 52B is written into the area 50B, the final page 53B is written. In other words, parallel write is performed excluding the last page, and regarding the last page, the final page 52A and the final page 53A are written twice in total by shifting time, and also the final page 52B and the final page 53B are written twice in total by shifting time. In the SSD 100, for example, write of the final page 52A and write of the final page 52B are simultaneously performed, and also write of the final page 53A and write of the final page 53B are simultaneously performed. Thus, data corresponding to the final page of the difference logs 23N is quadrupled. The write-in as described above is performed by the write control section 31.

Note that in the description hereafter, for the convenience of the explanation, the final page 52A written immediately after the first data 51A, and the final page 52B written immediately after the second data 51B, are called first final page in some cases. Also, the final page 53A written after the final page 52A and the final page 53B written after the final page 52B, are called a second final page in some cases. A predetermined data stored in the second final page may be called a finalizing log in some cases.

When the write-in time of the first data 51A, 51B into the areas 50A, 50B, and the write-in time of the final pages 52A, 52B are respectively expressed by t1, and the time from writing the first final page up to end of the write-in of the second final page is expressed by t2, the time required for writing the difference logs 23N is expressed by t1+t2.

Figure 4:
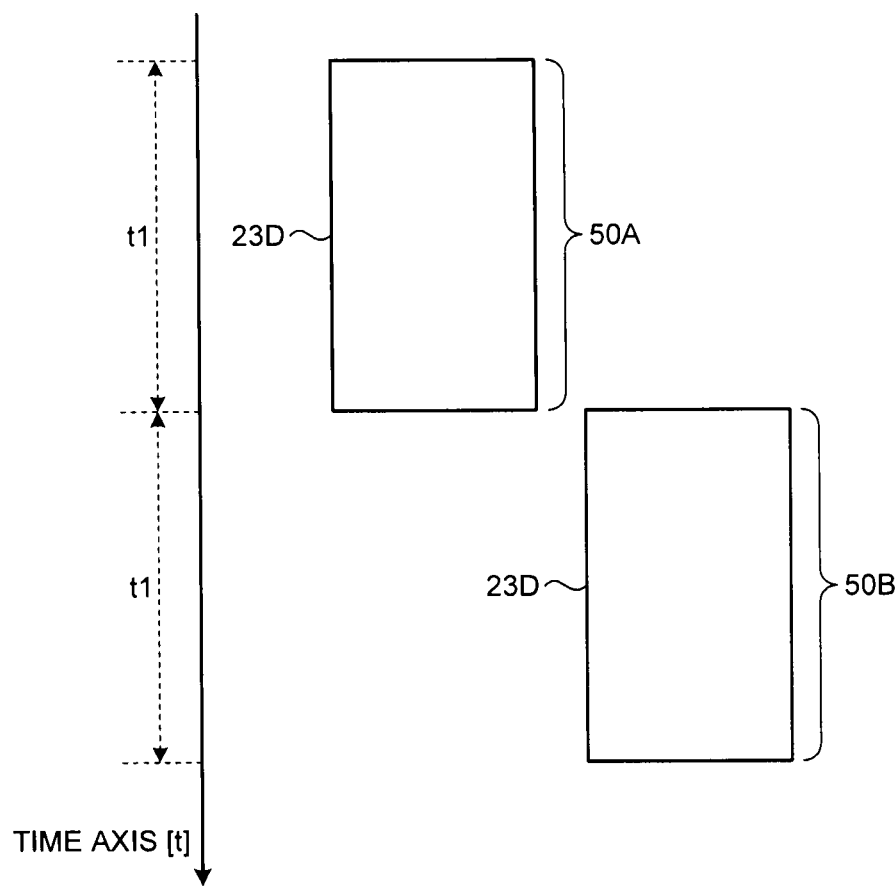
FIG. 4 is a view for describing a write timing when the difference logs are written twice not in parallel but by continuous processing.

FIG. 4 is a view for describing the write-in timing when the difference logs are not written into parallel but are written twice by continuous processing. When the difference logs 23D in the DRAM 20 are not written into the NAND memory 10 in parallel, and are written twice by the continuous processing, the difference logs 23D are written into the area 50A in the SSD 100. Thereafter, the SSD 100 writes the difference logs 23D into the area 50B again. Thus, when the difference logs 23D are written twice into the NAND memory 10, the time required for writing the difference logs 23D is 2×t1. In other words, when the difference logs 23D are written twice by continuous processing for duplication to store the logs, a time twice the write-in time is required for each data size.

t2 is a shorter time than t1, and therefore by writing the difference logs 23N into the NAND memory 10 by parallel write, the difference logs 23N can be stored in a shorter time than a case that the difference logs 23D are written twice by continuous processing. Thus, by performing the parallel write of the difference logs 23N, the SSD 100 can store the difference logs 23N in a shorter time even in a case of a large write data size.

Figure 5:
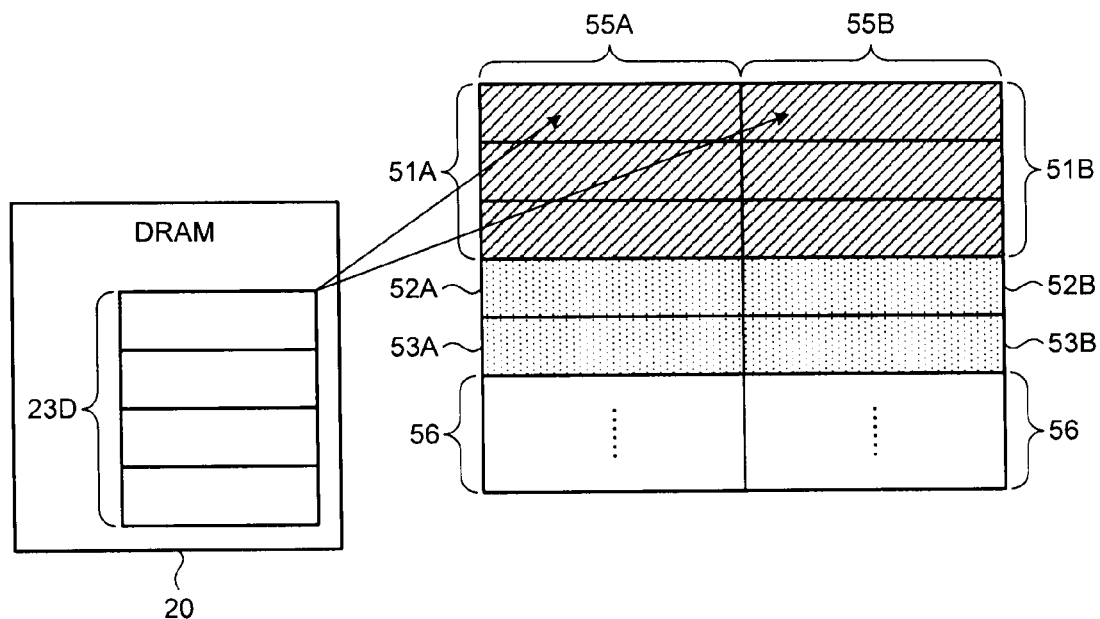
FIG. 5 is a view for describing a parallel write position of the difference log.

FIG. 5 is a view for describing parallel write positions of the difference logs. The SSD 100 selects two parallel-writable blocks, from units such as parallel-writable banks, chips, and channels in the NAND memory 10, and writes the difference logs 23N into each block. FIG. 5 illustrates a case that a block 55A and a block 55B are selected as parallel-writable blocks.

By the SSD 100, the difference logs 23D stored in the DRAM 20 are stored in the blocks 55A, 55B by page units. Data is written into the block 55A by page units, in an order of the first data 51A, first final page 52A, and second final page 53A. Similarly, data is written into the block 55B in an order of the second data 51B, first final page 52B, and second final page 53B. Note that a page after the second final pages 53A, 53B is an unwritten (erase) page (unwritten page 56).

A write procedure of the difference logs 23N into the NAND memory 10 during commit will be described next.
(Step 1) The write control section 31 obtains a size of each difference log 23D to be committed in the DRAM 20.
(Step 2) The write control section 31 obtains the number of write-in pages of the difference logs 23N, from a log size of each difference log 23D, as the number X of the write-in pages of data into the NAND memory 10.
(Step 3) The write control section 31 stores the number X of the write-in pages into a header portion of the difference log 23N stored in the NAND memory 10, and prepares the difference logs 23N as log data.
(Step 4) The write control section 31 secures the NAND block, being a block of the NAND memory 10 of a write destination, if the NAND block is not secured yet. A parallel-writable block is secured as the NAND block.
(Step 5) The write control section 31 erases the secured NAND block by block units, if the NAND block, being the write destination, is unwritten.
(Step 6) The write control section 31 confirms a page of the NAND block to be written, being the write destination.
(Step 7) The write control section 31 writes data of the difference logs 23N in parallel up to page (X−1).
(Step 8) The write control section 31 writes data to page X into the NAND block by shifting time from the write into the page (X−1).

Figure 6:
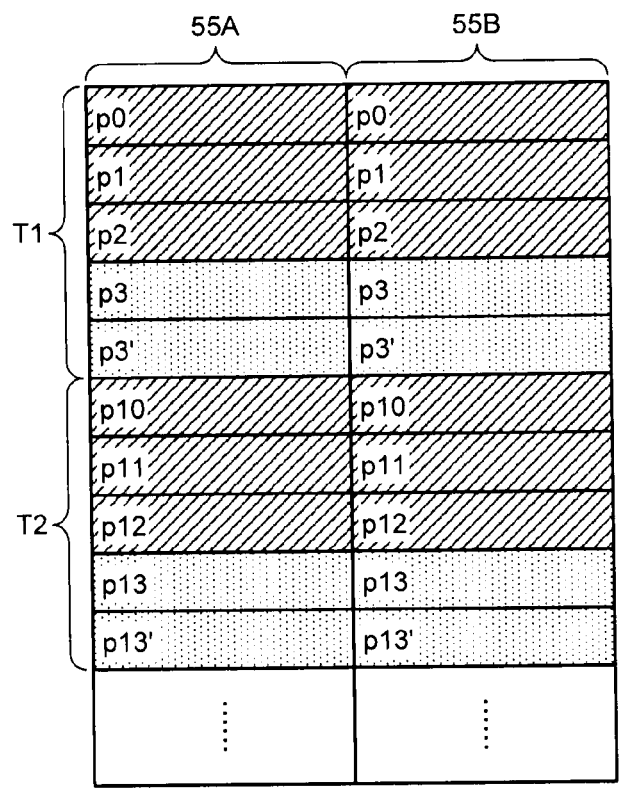
FIG. 6 is a view for describing a read-out operation of the difference logs from NAND memory.

Read-out operation of the duplicated and stored difference logs 23N will be described next. FIG. 6 is a view for describing the read-out operation of the difference logs from the NAND memory. The data of the difference logs 23N is appended to the NAND memory 10 by page units. Wherein, appending shows a write system in which when new data is written into the NAND memory 10, a blank page next to an already written page in the block (page address is continued) is selected to be a page to be written.

For example, page p0, page p1, and page p2, being first data 51A, are written into the block 55A in this order, as first commit T1, and thereafter p3, p3' are written as final pages. At this time, page p0, page p1, and page p2 are written into the block 55B as second data 51B, and thereafter p3, p3' are written as final pages.

Thereafter, at the next commit timing, page p10, page p11, and page p12 as first data 51A are written into the block 55A in this order, and thereafter in second commit T2, p13 and p13' are written as final pages. At this time, page p10, page p11, and page p12 as second data 51B are written into this order into the block 55B, and thereafter p13, p13' as final pages are written.

The log commit is performed at favorable timing with a good break point when the referential integrity of the management table 21 is obtained, and the difference logs 23N are appended as required during operation of the SSD 100. Therefore, in the continuously written blocks 55A, 55B as illustrated in FIG. 6, each break of commit data needs to be determined. Although an amount of the difference logs 23N (log data) written at the same time, may be a fixed size or a fixed page according to a purpose of use, it may also be a variable size, because the changed difference of the management table 21 is generally changed depending on the kind of the operation. Therefore, the size of the commit log or the number of write-in pages, or both of them is held in a header area of a format of the difference logs 23N. Thus, by reading a page head and reading the data size or the number of write-in pages stored in the header portion, the number of write-in pages of the commit log can be recognized.

The difference logs 23N are appended, and therefore when the difference logs 23N are read at startup of the system, data of the difference logs 23N is read for every size of one write-in unit. For example, when the amount of the difference logs 23N to be written at one time corresponds to 10 pages, read-out operation of the difference logs 23N is performed for every data of 10 pages. Then, when the difference logs 23N are read, it is read up to a second final page, which is a page next to a first final page. Thus, the irregular power-off during write-in operation can be recognized.

Figure 7:
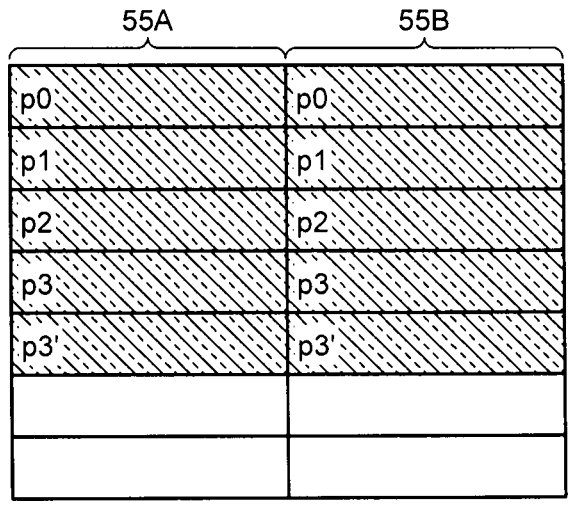
FIG. 7 is a view for describing a data state of the difference logs stored in the NAND memory.

A data state of the difference logs stored in the NAND memory will be described next. FIG. 7 is a view for describing the data state of the difference logs 23N stored in the NAND memory 10.

In the SSD 100, at the startup of the system, the difference logs 23N are sequentially read, and the changed contents of the difference logs 23N are sequentially reflected in the management table 21, being the master table, to thereby realize the continuous operation across a power cycle. A read-out unit of the difference logs 23N is a page unit, and a system status during write-in operation is determined based on a generation state of read-out error.

FIG. 7 illustrates a state that the difference logs 23N are normally written. Namely, when the difference logs 23N are normally written, readable pages (pages p0, p1, p2, p3, and p3') are respectively stored in the blocks 55A, 55B. Then, there are already erased pages after a page next to the page p3' which is the second final page, and when this erased page is read, read-out error is generated.

In the NAND memory 10, an erase operation needs to be performed by specified block units, and therefore the block needs to be erased before a first page is written. Further, a write-in operation needs to be performed sequentially from page p0, thus making it impossible to write continuously from page 100 after page p0 is written. Therefore, as illustrated in FIG. 7, for example, when log data of 4 pages from page p0 to page p3 is written, data of 5 pages is written including the last page p3' which is written by shifting time. Then, data unwritten pages after the final page p3' is in an erased state. Whether or not the page is the erased page, can be judged by performing read-out operation using a method different from an ordinary read-out method. Here, such a judgment processing is called an erased state judgment. In the SSD 100, the NAND controller 11 has a function of judging the erased state. Japanese Patent Laid Open Publication No. 2009-217392 discloses the function of judging the erased state. Note that the SSD 100 also has a function of separately managing the final write-in page of each block, and in this case, the function of judging the erased state is not required.

Figure 8:
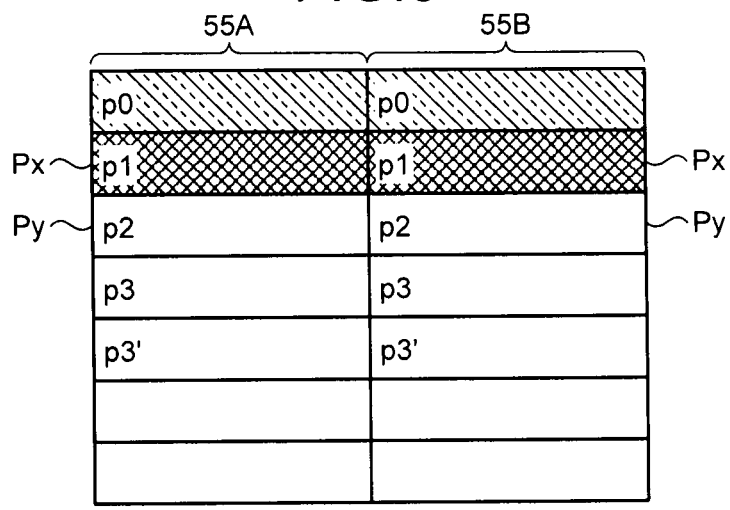
FIG. 8 is a view illustrating an example of data states of the difference logs when irregular power-off occurs.

Here, explanation will be given for a data state (storage state) of the difference logs 23N in a case of an abnormal storage of the difference logs 23N in the NAND memory 10. The storage abnormality of the difference logs 23N is generated in a case that the irregular power-off occurs when the difference logs 23N are stored in the NAND memory 10, or in a case that the data destruction occurs in the NAND memory 10 after the difference logs 23N are stored in the NAND memory 10. FIG. 8 is a view illustrating an example of the data state of the difference logs in a case that the irregular power-off occurs. Further, FIG. 9 is a view illustrating an example of the data state of the difference logs in a case that the data destruction occurs.

As illustrated in FIG. 8, when the irregular power-off occurs during write-in operation of the difference logs 23N (page p1), page p1 becomes error page Px, because data cannot be normally written due to irregular power-off. In this case, a page next to error page Px which is unsuccessful in writing, is unwritten and therefore becomes erased page Py.

Note that the page to be the error page becomes sometimes a page head or a page end. In this case as well, the pages are appended by page units, and therefore, the situation is not changed. Namely, the page next to the error page which is unsuccessful in writing, is unwritten and therefore becomes the erased page.

Figure 9:
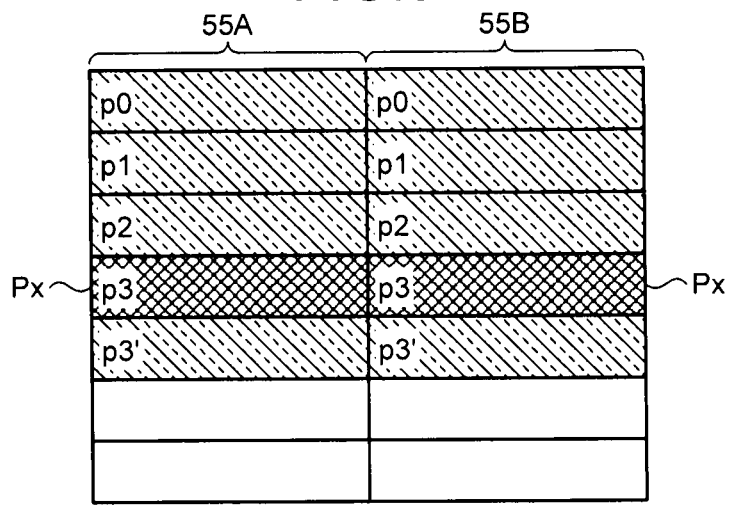
FIG. 9 is a view illustrating an example of the data states of the difference logs when data destruction occurs.

Further, as illustrated in FIG. 9, when the data destruction of the NAND memory 10 occurs, irrespective of a situation that write commit is normally ended during write-in operation of the difference logs 23N, read-out error occurs somewhere in a middle of the page although data is written up to a final page write-in position. In this case, the page next to the error page Px is in a state that data is written. Of course, abnormality due to data destruction can occur in the final page, irrespective of a state that the page end is normally written.

Therefore, in this embodiment, it is judged whether last commit log may be reflected by writing twice the final page, being the page end, or whether the abnormality is regarded as a start invalidating error (a state judged to be a breakdown) at startup of the system. In other words, by duplicating the page end, the data restorer 32 judges whether an error is a read-out error due to irregular power-off, or a read-out error due to data destruction. Note that even if one of the duplicated final pages is lost due to data destruction, when the other one is correctly written, the commit log can be reflected in a correctly written page.

Figure 10A:
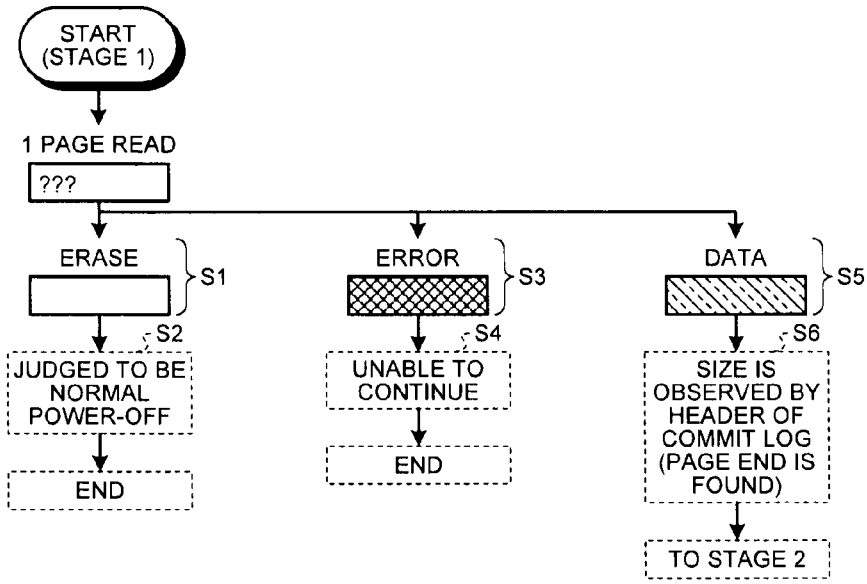
FIG. 10A and FIG. 10B are views illustrating a classification processing procedure of the irregular power-off and the data destruction.
Figure 10B:
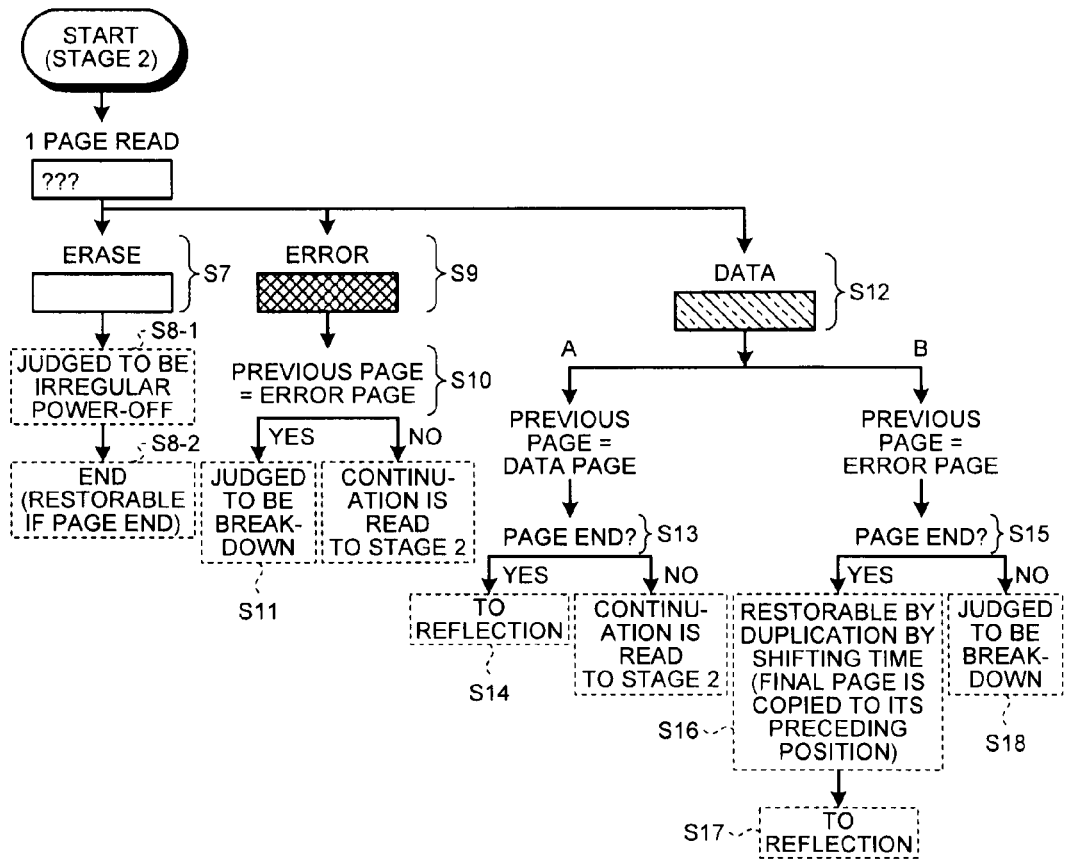

FIG. 10A and FIG. 10B are views illustrating a classification processing procedure of the irregular power-off and the data destruction. FIG. 10A and FIG. 10B illustrate a pattern classification processing procedure of a read-out state, wherein a read-out operation per commit is shown. An end state of this flow is reflected in the DRAM 20 of the difference logs 23N.

The NAND controller 11 repeats the processing of reading the difference logs 23N per commit, and reflecting the changed contents of the difference logs 23N in the management table 21. At this time, the data restorer 32 determines an end of the difference logs 23N, by judging whether or not the final page of the NAND block in which the difference logs 23N are stored, is already erased.

At startup of the SSD 100, the data restorer 32 confirms a page position of the NAND block to be read, as the processing of Stage 1. Then, the data restorer 32 reads one page of the difference log 23N, from the NAND memory 10 (one page read), via the NAND controller 11.

When the read-out page is the erased page (Erase) (S1), this is a state that the difference logs 23N are ended by the preceding commit, or the difference logs 23 are not stored. In this case, the data restorer 32 judges that the difference logs 23N have no continuation thereafter. Then, the data restorer 32 judges that the difference logs 23N are normally divided and set in DATA END state (normal power-off state) (S2), so that the processing of reflecting the difference logs 23N in the management table 21 is ended.

Further, when the read-out page is the error page (Error) (S3), the data restorer 32 cannot acquire a commit page size E from a commit log header, thus making it impossible to continue read-out operation (S4). Therefore, the read-out operation is ended.

Further, when the read-out page is correct data (Data) (S5), the data restorer 32 acquires the commit page size E from the commit log header. Thus, the page end of the difference logs 23N is found (S6). Thereafter, in the SSD 100, the processing of Stage 2 is performed.

The data restorer 32 confirms a page position of the NAND block to be read, as the processing of Stage 2. Then, the data restorer 32 reads a second page of the difference log 23N, from the NAND memory 10 via the NAND controller 11 (one page Read).

When it is suspected that there is an error in the read-out page, the NAND controller 11 judges whether the read-out page is in an erased state. Thus, whether the page suspected to be error is the erased page (Erase) or the error page (Error), is judged.

When the read-out page is the erased page (Erase) (S7), the data restorer 32 judges that the irregular power-off occurs in somewhere on the read-out page (S8-1). Further, the data restorer 32 judges whether the number R of presently read-out pages coincides with the commit page size E.

Then, when the number R of presently read-out pages coincides with the commit page size E (when the read-out page is the page end), the data restorer 32 judges that the irregular power-off occurs when one of the duplicated page ends (first final page) is written, and the processing is moved to the reflection processing. Specifically, the data restorer 32 reflects the difference log 23N in the management table 21, which is the difference log 23N that can be read up to the final page, out of the difference logs 23N in the NAND memory 10 (S8-2).

Meanwhile, when the number R of presently read-out pages does not coincide with the commit page size E, the data restorer 32 judges that the irregular power-off occurs in a state that the difference logs 23 are written into the NAND memory 10 up to its middle portion, and judges that this is the end of the logs.

Further, when the read-out page is not the erased page (Erase), the read-out page is the error page (Error). When the read-out page is the error page (S9), the data restorer 32 judges whether or not the previous read-out page (LAST_PAGE) is successful in reading. In other words, whether or not the previous page is the error page is judged (S10).

When the previous read-out page (LAST_PAGE) is not the error page (No in S10), the data restorer 32 performs read-out operation of the pages after a second page. In this case, the data restorer 32 performs the processing of Stage 2 (read-out operation of the pages after a third page) from the first, as the processing of reading the continuation. Meanwhile, when the previous read-out page (LAST_PAGE) is the error page (Yes in S10), two pages are consecutively error pages, and therefore the data restorer 32 judges that the data destruction occurs (S11), and the data state is moved to a breakdown state.

Further, when the read-out page is normal data (Data) (s12), the data restorer 32 judges whether or not the previous read-out page (LAST_PAGE) is successful in reading. When the previous read-out page is successful in reading (when the previous page=data page), (A) the data restorer 32 judges whether or not the number R of presently read-out pages coincides with the commit page size E (S13).

When the number R of presently pages coincides with the commit page size E (when the read-out page is the page end) (Yes in S13), the data restorer 32 judges that read-out of the pages reaches a break of the commit log. Then, the processing by the data restorer 32 is moved to the processing of reflecting the read data in the management table 21 (S14).

Meanwhile, when the number R of presently read-out pages does not coincide with the commit page size E (when the read-out page is not the page end) (No in S13), the data restorer 32 judges that the commit log has a continuation thereafter. Then, the data restorer 32 performs the processing of Stage 2 from the first, as the processing of reading the continuation.

Further, when the read-out page is the normal data (S12), and the previous read-out page is unsuccessful in reading (when the previous page=error page) (B), the data restorer 32 judges whether or not the number R of presently read-out pages coincides with the commit page size E (S15).

When the number R of presently read-out pages coincides with the commit page size E (when the read-out page is the page end) (Yes in S15), the data restorer 32 can restore the management table 21 using one of the data of the duplicated page ends (first final page) (with duplicated time lag) (S16), and therefore the processing by the data restorer 32 is moved to the reflection processing, using the first final page (S17). In other words, when the management table 21 is restored using the difference log 23N, the management table 21 is restored by copying the second final page in an area of the DRAM 20 corresponding to one preceding page (the second final page is written into a position of the first final page).

Meanwhile, when the number R of presently pages does not coincide with the commit page size E (when the read-out page is not the page end) (No in S15), the data restorer 32 judges that error (breakdown) occurs in the middle of the difference logs 23N (S18). In this case, the data restorer 32 judges that the data destruction occurs, and the data state is moved to a breakdown state. When the breakdown state is established, the SSD 100 does not restore the difference logs 23N in the DRAM 20.

Thus, in this embodiment, the irregular power-off can be judged when read-out error occurs, and the data destruction of the NAND memory 10 can be judged by reading the page next to the error page and judging error and erased state thereof.

By the aforementioned processing of FIG. 10A and FIG. 10B, a read-out state of the difference log 23N at the time of the irregular power-off, and a read-out state of the difference log 23N at the time of the data destruction, are variously classified. Then, restoration of the management table 21 and transition to the breakdown state are performed every time the classified difference log 23N is read.

FIG. 11A to FIG. 11M are views illustrating classification examples of read-out states of the difference logs. FIG. 11A to FIG. 11M show pages, into which data is written, by "data" (written), and show error pages, from which the data cannot be read, by "error" (Error), and show erased pages by "erased" (Erased), and further show the pages, from which the data is not read yet, by "unread".

FIG. 11A to FIG. 11C illustrate read-out states (data states) when the number of pages of each difference log 23N excluding the second final page is smaller than the number X of write-in pages stored in the header portion of the difference log 23N. Further, FIG. 11D to FIG. 11J illustrate read-out states when the number of pages of the difference log 23N excluding the second final page is the same as the number X of write-in pages. Further, FIG. 11K to FIG. 11M illustrate read-out states when the page head p0 cannot be read, and the number X of write-in pages cannot be read from the header portion of the difference log 23N.

FIG. 11A illustrates a case that page p2 which is the page before the first final page p3, is the erased page, and the first final page p3 is the erased page. In this case, it is so judged that the irregular power-off occurs before the data is written into the page p2 (after the data is written into the page p1).

FIG. 11B illustrates a case that the page p2 which is the page before the first final page p3, is the error page, and the first final page p3 is the erased page. In this case, it is so judged that the irregular power-off occurs during write-in operation of the data into the page p2. Thus, in a case of FIG. 11A and FIG. 11B, it is so judged that the irregular power-off occurs, because the page next to the erased page or the error page is already erased (unwritten).

FIG. 11C illustrates a case that page p2 is the error page, and first final page p3 is the error page. In this case, there are two consecutive error pages, and therefore it is so judged that the data destruction occurs in the page p2 and the first final page p3.

FIG. 11D illustrates a case that first final page p3 is the erased page, and second final page p3' is the erased page. In this case, it is so judged that the irregular power-off occurs before the data is written into the first final page p3 (after the data is written into page p2).

FIG. 11E illustrates a case that the first final page p3 is the error page, and second final page p3' is the erased page. In this case, it is so judged that the irregular power-off occurs during write-in operation of the data into the first final page p3. Thus, in a case of FIG. 11D and FIG. 11E, the page next to the erased page or the error page is already erased, and therefore it is judged that the irregular power-off occurs.

FIG. 11F illustrates a case that the first final page p3 is the error page, and the second final page p3' is the error page. In this case, there are two consecutive error pages, and therefore it is so judged that the data destruction occurs in the first final page p3 and the second final page p3'.

FIG. 11G illustrates a case that the pages up to the first final page p3 are normal data pages, and second final page p3' is the erased page. In this case, it is so judged that the irregular power-off occurs before the data is written into the second final page p3' (after the data is written into the first final page p3). FIG. 11H illustrates a case that all pages are normal data pages.

FIG. 11I illustrates a case that the first final page p3 is the error page, and second final page p3' is the normal data page. In this case, it is so judged that the data destruction occurs in the first final page p3. Even in this case, the second final page p3' is the normal data page, and therefore data of the difference logs 23D are all stored in the NAND memory 10.

FIG. 11J illustrates a case that page p2 which is the page before the first final page p3 is the error page, and the first final page p3 is the normal data page. In this case, it is so judged that the data destruction occurs in the page p2 which is the page in the middle of the difference log 23N (the page excluding the final page).

FIG. 11K illustrates a case that pages p1, p2, being page heads, are erased pages. In this case, it is so judged that the irregular power-off occurs before the data is written into the page p1.

FIG. 11L illustrates a case that the page p1, being the page head, is the error page, and the page p2, being the page next to the page p1 is the erased page. In this case, it is so judged that the data destruction occurs in the page p1.

FIG. 11M illustrates a case that the page p1, being the page head, is the error page, and the page p2, being the page next to the page p1, is the error page. In this case, there are two consecutive error pages, and therefore it is so judged that the data destruction occurs in the page p1 and the page p2.

In the cases of FIG. 11A, FIG. 11B, FIG. 11D, FIG. 11E, FIG. 11K, and FIG. 11L, there are pages that cannot be read, and therefore the data restorer 32 restores the management table 21, using one preceding stored difference log 23N.

Further, in the cases of FIG. 11C, FIG. 11F, FIG. 11J, and FIG. 11M, the management table 21 is not restored, because the data destruction occurs. Further, in the cases of FIG. 11G, FIG. 11H, and FIG. 11I, the data restorer 32 restores the management table 21, using the difference logs 23N illustrated in FIG. 11G, FIG. 11H, and FIG. 11I. For example, in a case of FIG. 11G, the management table 21 is restored using the first final page p3', and in a case of FIG. 11I, the management table 21 is restored using the second final page p3'.

For example, in a case of the difference log 23N illustrated in FIG. 11B, page p0 is read by the processing of Stage 1, in accordance with processing procedures illustrated in FIG. 10A and FIG. 10B. Page p0 is normal data (Data) (s5), and therefore page p1 is read by starting the processing of Stage 2.

Page p1 is normal data (Data) (s12), and preceding page p0 is normal data (Data) (A), and page p1 is not the page end (No in s13), and therefore page p2 is read by starting the processing of Stage 2 again.

Page p2 is the error page (Error) (s9), and the preceding page p1 is not the error page (Error) (No in s10), and therefore page p3 is read by starting the processing of Stage 2 again. Page p3 is the erased page (Erase) (s7), and therefore is judged to be the irregular power-off (s8-1). Note that page p3 is not the page end, and therefore restoration is not performed.

Further, in a case of the difference log 23N illustrated in FIG. 11J, page p0 is read by the processing of Stage 1, in accordance with processing procedures illustrated in FIG. 10A and FIG. 10B. Page p0 is normal data (Data) (s5), and therefore page p1 is read by starting the processing of Stage 2.

Page p1 is normal data (Data) (s12), and preceding page p0 is normal data (Data) (A), and page p1 is not the page end (No in S13). Therefore, page p2 is read by starting the processing of Stage 2 again.

Page p2 is the error page (Error) (s9), and preceding page p1 is not the error page (Error) (No in s10). Therefore, page p3 is read by starting the processing of Stage 2 again. Page p3 is normal data (Data) (s12), and preceding page p2 is the error page (Error) (B), and page p3 is not the page end (No in s15), and therefore is judged to be the data destruction (breakdown) (s18).

Note that when judgment whether the irregular power-off occurs, or whether the data destruction occurs, is possible without confirming the number X of write-in pages, such a judgment whether the irregular power-off occurs, or whether the data destruction occurs, is acceptable without confirming the number X of write-in pages.

Thus, whether the irregular power-off occurs, or whether the data destruction occurs can be judged, depending on the read-out states of the two consecutive pages of the difference log 23N. Note that in this embodiment, as illustrated in FIG. 5, parallel write is performed to the difference log 23N into two blocks 55A,55B so as to be duplicated. Therefore, even when one of the data of the duplicated difference logs 23N cannot be read, but the other data can be read, the management table 21 is restored using the data that can be read.

FIG. 12 is a view for describing an example of handling the duplicated pages. FIG. 12 illustrates a combination of the read-out state of the difference log 23N written into ch0 (first block) (the data state of one of the parallel-written pages), and the read-out state of the difference log 23N written into ch1 (second block) (the data state of the other one of the parallel-written pages). The read-out state of the difference log 23N is any one of a data page into which data is written (written), and an error page from which data cannot be read (Error), and an erased page from which data is erased (Erased).

For example, when at least one of the page of ch0 and the page of ch1 is the data page (Written), this page is handled as the data page (Written). Further, when both the page of ch0 and the page of ch1 are not the data pages (Written) and at least one of the page of ch0 and the page of ch1 is the error page (Error), this page is handled as the error page (Error). Then, when both the page of ch0 and the page of ch1 are not the data pages (Written), and both the page of ch0 and the page of ch1 are not the error pages (Error), these pages are handled as erased pages Erased). In other words, when both the page of ch0 and the page of ch1 are the erased pages, these pages are handled as the erased pages. Thus, when there is data at least in one of the page of ch0 and the page of ch1, this page is handled to have data.

Note that in this embodiment, the irregular power-off at the time of log commit is detected based on the difference log 23N written at the time of log commit. However, the irregular power-off may also be detected using log information other than the difference log 23N. In this case, active log showing a status of an operating system, is stored in the NAND memory 10 before a first difference log 23N after startup of the system is stored in the NAND memory 10. Thereafter, the difference log 23N is stored in the NAND memory 10. Further, at halt of a normal system, a standby log showing a halt state of the system, is stored in the NAND memory 10 following the difference log 23N. Thus, log storage processing for detecting the irregular power-off is executed. Then, at startup of the system, whether the system is normally halted or whether the irregular power-off occurs previously is judged based on the storage states of the active log and the standby log in the NAND memory 10.

Here, write procedures of the active log and the standby log will be described. FIG. 13A and FIG. 13B are views illustrating the write procedures of the active log and the standby log. FIG. 13A illustrates a state of NAND logs (logs stored in the NAND memory 10) at startup of the next system when normal power-off is carried out, and FIG. 13B illustrates a state of the NAND logs at startup of the next system when the irregular power-off occurs (when there is no standby log, although there is the active log).

As illustrated in FIG. 13A, in a case of the normal power-off, the active log is stored first as NAND log, and the difference logs are stored next (there are no difference logs in some cases), and the standby log is stored finally. Thus, in a case of a normal sequence, there is no update of data in a standby state. Further, the normal power-off is carried out after receiving a halt request from a host, and therefore power-off does not occur in an active state. The data restorer 32 reads the NAND log from the NAND memory 10 in an initialization processing after turning-on power, and scans the content from front. Usually, scan is started from the active log, the difference log, and the standby log, with this order repeated thereafter, and is ended by the standby log finally. The data restorer 32 judges that the normal power-off is carried out when the active log is stored first and the standby log is stored finally.

Meanwhile, as illustrated in FIG. 13B, in a case of the irregular power-off, only the active log exists, and there is no standby log stored finally. Namely, although there is write-in operation into the NAND memory 10 by writing the active log, the irregular power-off can be detected in a state that the log commit is not ended. The data restorer 32 judges that the irregular power-off occurs when the last log is recognized not to be the standby log (active log or difference log).

Note that in this embodiment, explanation is given for the case that the difference log 23N is duplicated and stored as the multiplexed storage of the difference logs 23N. However, the difference logs 23N may also be stored in a multiplex state such as triplex or more.

Further, in this embodiment, explanation is given for the case that the second final page is the same data as the first final page. However, the second final page may also be an arbitrary data page. In this case as well, the data restorer 32 judges whether or not desired data is written into the second final page. Then, when the desired data is not written, whether the second final page is the error page or the erased page is judged, and by using this judgment result, it is detected whether the irregular power-off occurs or the data destruction occurs.

Further, in this embodiment, explanation is given for the case that the difference log 23N is multiplexed by performing parallel write-in operation to the second final page. However, the second final page may also be multiplexed by the write-in operation other than the parallel write-in operation.

Figure 14:
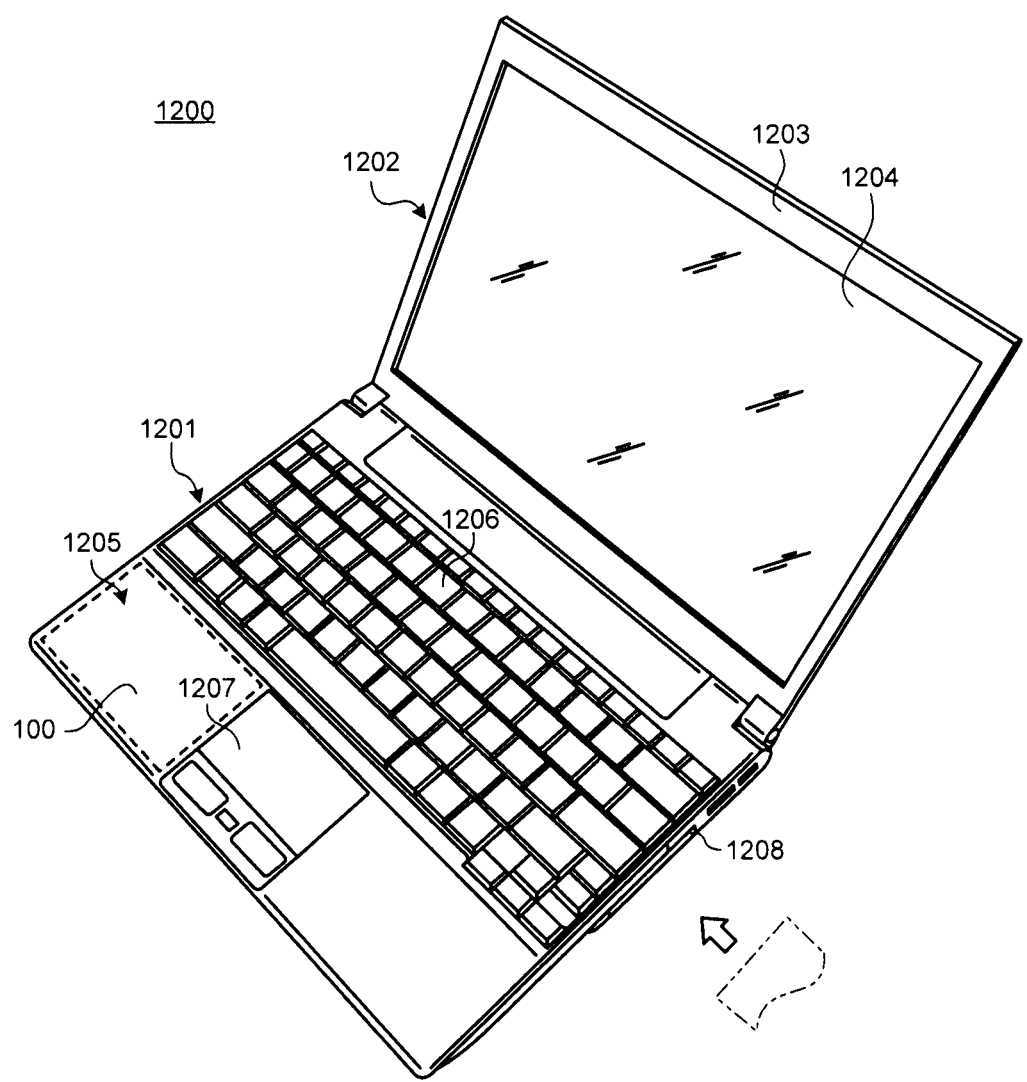
FIG. 14 is a perspective view illustrating an example of a personal computer on which the SSD is mounted.

FIG. 14 is a perspective view illustrating an example of a personal computer with the SSD 100 mounted thereon. A personal computer 1200 includes a main body 1201, and a display unit 1202. The display unit 1202 further includes a display housing 1203, and a display device 1204 housed in this display housing 1203.

The main body 1201 includes a casing 1205, a keyboard 1206, and a touchpad 1207, being a pointing device. A main circuit board, an ODD (optical disk device) unit, a card slot, and the SSD 100, etc., are housed in the casing 1205.

The card slot is provided adjacent to a peripheral wall of the casing 1205. An opening 1208 opposed to the card slot is provided on the peripheral wall. A user can insert/extract an additional device into/from the card slot from outside the casing 1205 through the opening 1208.

The SSD 100 may be used in a state of being mounted in the personal computer 1200 as a replacement of a conventional HDD, or may be used as an additional device in a state of being inserted into the card slot provided in the personal computer 1200.

Figure 15:
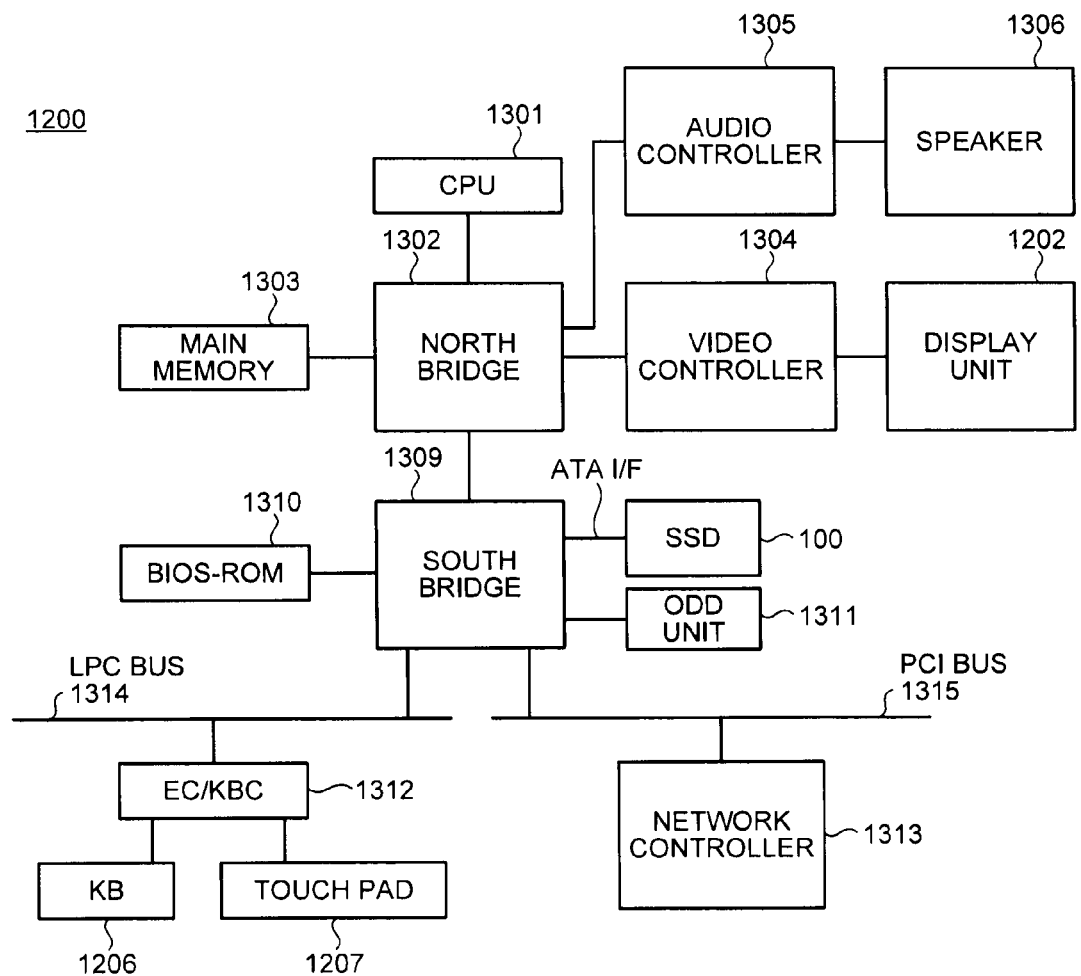
FIG. 15 is a view illustrating a constitutional example of a system of the personal computer on which the SSD is mounted.

FIG. 15 illustrates a constitutional example of a system of the personal computer with SSD mounted thereon. The personal computer 1200 includes: a CPU 1301, a north bridge 1302, main memory 1303, a video controller 1304, an audio controller 1305, a south bridge 1309, BIOS-ROM 1310, SSD 100, an ODD unit 1311, an embedded controller/keyboard controller IC (EC/KBC) 1312, and a network controller 1313, etc.

The CPU 1301 is a processor provided for controlling an operation of the personal computer 1200, and executes an operating system (OS) loaded on the main memory 1303 from the SSD 100. Further, when the ODD unit 1311 enables a loaded optical disc to execute at least one of the read-out operation and the write-in operation, the CPU 1301 executes the processing.

Further, the CPU 1301 also executes a BIOS (Basic Input Output System) stored in the BIOS-ROM 1310. Note that the system BIOS is a program for controlling hardware in the personal computer 1200.

The north bridge 1302 is a bridge device that makes a connection between a local bus of the CPU 1301 and the south bridge 1309. A memory controller that performs access control over the main memory 1303 is also incorporated in the north bridge 1302.

Further, the north bridge 1302 also has a function of communicating with the video controller 1304 and the audio controller 1305 via AGP (Accelerated Graphics Port) bus, etc.

The main memory 1303 temporarily stores programs and data, and functions as a work area of the CPU 1301. The main memory 1303 is constructed by DRAM for example.

The video controller 1304 is a video playback controller that controls the display unit 1202 used as a display monitor of the personal computer 1200.

The audio controller 1305 is an audio playback controller that controls the speaker 1306 of the personal computer 1200.

The south bridge 1309 controls each device on a LPC (Low Pin Count) bus 1314, and a PCI (Peripheral Component Interconnect) bus 1315. Further, the south bridge 1309 controls the SSD 100 via ATA interface, the SSD 100 being a storage device that stores each kind of software and data.

The personal computer 1200 accesses the SSD 100 by sector units. Write command, read command, and flash command, etc., are inputted to the SSD 100 via the ATA interface (I/F).

Further, the south bridge 1309 also has a function of executing access control over the BIOS-ROM 1310 and the ODD unit 1311.

The EC/KBC 1312 is one chip microcomputer integrated with an embedded controller for power control, and a keyboard controller for controlling the keyboard (KB) 1206 and the touch pad 1207.

The EC/KBC 1312 has a function of turning ON/OFF the power of the personal computer 1200 according to an operation of a power button by a user. The network controller 1313 is a communication device that communicates with external network such as the Internet.

The personal computer 1200 supplies power to the SSD 100, and issues a halt request (standby request) to the SSD 100. Even if a power supply to the SSD 100 from the personal computer 1200 is irregularly cut, generation of write error can be prevented.

According to this embodiment, the difference logs 23N are stored in a state of being multiplexed by parallel write-in operation, and therefore the difference logs 23N can be stored in a short time. Further, final pages 52A, 52B, and final pages 53A, 53B, being the same data as the data of the final pages 52A, 52B, are written into the NAND memory 10 as difference logs 23N. Therefore, the irregular power-off and the data destruction can be easily and surely detected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a first volatile storage area;
   a second nonvolatile storage area including a plurality of blocks, each one of the plurality of blocks being a data erasing unit and including a plurality of pages, and each one of the plurality of pages being a data programming unit;
   an address translation table stored in the second nonvolatile storage area and associating logical addresses designated by a host device with physical addresses of the second nonvolatile storage area; and
   a data manager configured to:
      transmit the address translation table stored in the second storage area to the first storage area at startup of the memory system;
      when an event to update the address translation table occurs, write difference logs indicating difference information before and after update of the address translation table in the first storage area; and
      when a predetermined condition is satisfied, write first difference logs in a first block and second difference logs having the same information as the first difference logs in a second block by a parallel page programming operation, thereafter write a first finalizing log in the first block and a second finalizing log in the second block.

2. The memory system according to claim 1, wherein the first finalizing log has the same information as the second finalizing log.

3. The memory system according to claim 1, wherein the data manager writes the first finalizing log and the second finalizing log by the parallel page programming operation.

4. The memory system according to claim 1, wherein the data manager, when the predetermined condition is satisfied, incorporates the difference logs into the address translation table stored in the first storage area.

5. The memory system according to claim 1, wherein the data manager duplicates the difference logs and thereby generates the first difference logs and the second difference logs.

6. The memory system according to claim 1, further comprising a data restorer configured to determine status of the memory system from at least three statuses:
   the difference logs are normally stored in the second storage area;
   an irregular power-off has occurred during writing the difference logs in the second storage area; and
   a data destruction has occurred after writing the difference logs in the second storage area.

7. The memory system according to claim 1, wherein the first finalizing log has the same information as data stored in a final page of the first difference logs and the second finalizing log has the same information as data stored in a final page of the second difference logs.

8. The memory system according to claim 6, wherein the data restorer determines the status of the memory system based on data storage states of a first page and data storage states of a second page programmed following the first page, the first and second pages are selected from the difference logs and the finalizing logs.

9. The memory system according to claim 8, wherein the data storage states include erased data state, error data state and normal data state.

10. The memory system according to claim 6, wherein
    the data manager writes a number of pages provided for the difference logs in the second storage area together with the difference logs; and
    the data restorer determines the status of the memory system based on whether the number of pages provided for the difference logs and a number of pages successfully read out from the difference logs coincide with each other.

11. The memory system according to claim 10, wherein the data manager writes the number of pages in a start page of the difference logs.

12. The memory system according to claim 6, wherein
    a number of pages provided for the difference logs is a fixed value; and
    the data restorer determines the status of the memory system based on whether the fixed value and a number of pages successfully read out from the difference logs coincide with each other.

13. The memory system according to claim 6, wherein the data manager determines that the irregular power-off has occurred when at least one page provided for the difference logs and the finalizing logs is erased data state in the second storage area.

14. The memory system according to claim 6, wherein the data manager determines that the data destruction has occurred when a page provided for the finalizing logs is normal data state in the second storage area and at least one page provided for the difference logs is error data state.

15. The memory system according to claim 6, wherein the data manager determines that the data destruction has occurred when at least two consecutive pages are error data states in the difference logs and the finalizing logs.

16. The memory system according to claim 6, wherein when the data restorer determines that the difference logs are normally stored in the second storage area, the data manager restores the difference logs stored in the second storage area into the address translation table in the first storage area.

17. The memory system according to claim 6, wherein when the data restorer determines that data destruction has occurred after writing the difference logs in the second storage area, the data manager does not restore the difference logs stored in the second storage area into the address translation table in the first storage area.

18. The memory system according to claim 6, wherein when the data restorer determines that at least one of the first finalizing log and the second finalizing log is normally stored, the data manager restores the difference logs stored in the second storage area into the address translation table in the first storage area.

19. The memory system according to claim 9, wherein when the first and second pages are respectively erased data states, the data restorer determines that the irregular power-off has occurred during writing the difference logs in the second storage area.

20. The memory system according to claim 9, wherein when the first and second pages are respectively error data states, the data restorer determines that the data destruction has occurred after writing the difference logs in the second storage area.

21. The memory system according to claim 6, wherein when all of the difference logs are normal data states and a page provided for the finalizing logs is erased data state, the data restorer determines that the irregular power-off has occurred during writing the difference logs in the second storage area.

22. The memory system according to claim 6, wherein when at least one of the difference logs is error data state and a page provided for the finalizing logs is normal data state, the data restorer determines that the data destruction has occurred after writing the difference logs in the second storage area.

* * * * *